United States Patent
Pal et al.

(10) Patent No.: US 11,867,199 B2
(45) Date of Patent: Jan. 9, 2024

(54) COMPRESSOR WITH MOTOR COOLING IMPELLER

(71) Applicant: Hamilton Sundstrand Corporation, Charlotte, NC (US)

(72) Inventors: Debabrata Pal, Hoffman Estates, IL (US); Ashutosh Joshi, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/718,967

(22) Filed: Apr. 12, 2022

(65) Prior Publication Data
US 2023/0323896 A1  Oct. 12, 2023

(51) Int. Cl.
*F04D 29/58* (2006.01)
*F04D 25/06* (2006.01)
*F04D 29/28* (2006.01)
*F04D 17/12* (2006.01)

(52) U.S. Cl.
CPC ......... *F04D 29/5806* (2013.01); *F04D 17/12* (2013.01); *F04D 25/06* (2013.01); *F04D 29/284* (2013.01)

(58) Field of Classification Search
CPC ...... F04D 17/12; F04D 25/082; F04D 29/286; F04D 29/2277; F04D 29/5806; F04D 29/5846; F04D 29/584; H02K 9/06
USPC .......................................................... 310/63
See application file for complete search history.

(56) References Cited

U.S. PATENT DOCUMENTS

| | | | |
|---|---|---|---|
| 2,770,106 A | 11/1956 | Moody | |
| 6,155,802 A * | 12/2000 | Choi | F02C 6/12 415/199.1 |
| 7,302,804 B2 | 12/2007 | Murry et al. | |
| 8,863,548 B2 | 10/2014 | Hipsky | |
| 9,862,493 B2 | 1/2018 | Beers et al. | |
| 2015/0247506 A1 * | 9/2015 | Lee | F04D 29/5806 417/423.1 |
| 2020/0392900 A1 | 12/2020 | Kim | |

FOREIGN PATENT DOCUMENTS

| EP | 1843449 A1 | 10/2007 |
|---|---|---|
| WO | 99/13223 A1 | 3/1999 |

OTHER PUBLICATIONS

European Search Report for EP Application No. 23162444.6 dated Sep. 1, 2023.

* cited by examiner

*Primary Examiner* — Kenneth J Hansen
(74) *Attorney, Agent, or Firm* — Carlson, Gaskey & Olds, P.C.

(57) ABSTRACT

A compressor system includes a compressor, and an electric motor driving a shaft to drive the compressor. An inlet is connected to a source of air to be compressed. The inlet is connected to the compressor. A fan impeller is mounted in the inlet upstream of the compressor. A cooling air exit communicates with the inlet, and upstream of the compressor. The cooling air exit is connected to the motor to provide cooling air to the motor. A dual compressor system is also disclosed.

17 Claims, 4 Drawing Sheets

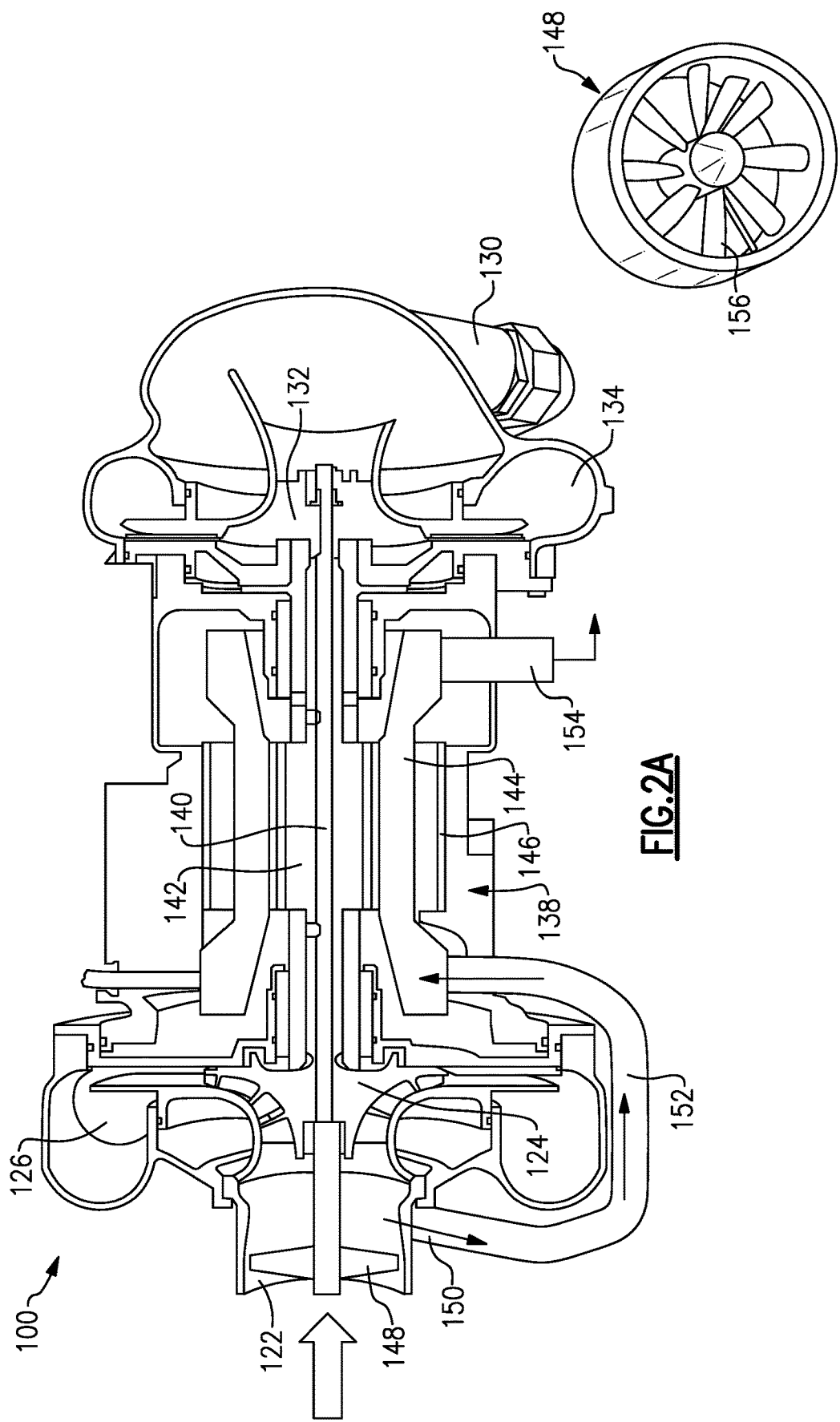

COMPRESSOR WITH MOTOR COOLING IMPELLER

BACKGROUND

This application relates to motor cooling for a motor driving a dual compressor.

Compressor systems are known wherein an electric motor drives a first and a second stage compressor. Air is compressed in the first stage compressor and delivered into the second stage compressor where it is further compressed. That air is then delivered to a use. In one application, the use may be for cabin air on an associate aircraft.

In the past, motor cooling has been provided by tapping air downstream of the first stage compressor and passing it through a heat exchanger, and then into the motor.

In addition, a second cooling air stream is provided by ram air from the associated aircraft. While this arrangement has generally proven effective, under certain flight conditions there may be undesirable low flow.

SUMMARY

A compressor system includes a compressor, and an electric motor driving a shaft to drive the compressor. An inlet is connected to a source of air to be compressed. The inlet is connected to the compressor. A fan impeller is mounted in the inlet upstream of the compressor. A cooling air exit communicates with the inlet, and upstream of the compressor. The cooling air exit is connected to the motor to provide cooling air to the motor.

A dual compressor system is also disclosed.

These and other features will be best understood from the following drawings and specification, the following is a brief description.

BRIEF DESCRIPTION OF THE DRAWINGS

FIG. 2A shows a detail of an improved motor cooling arrangement.

FIG. 2C shows an impeller which is incorporated into the FIGS. 2A and 2B systems.

DETAILED DESCRIPTION

Figure 1:
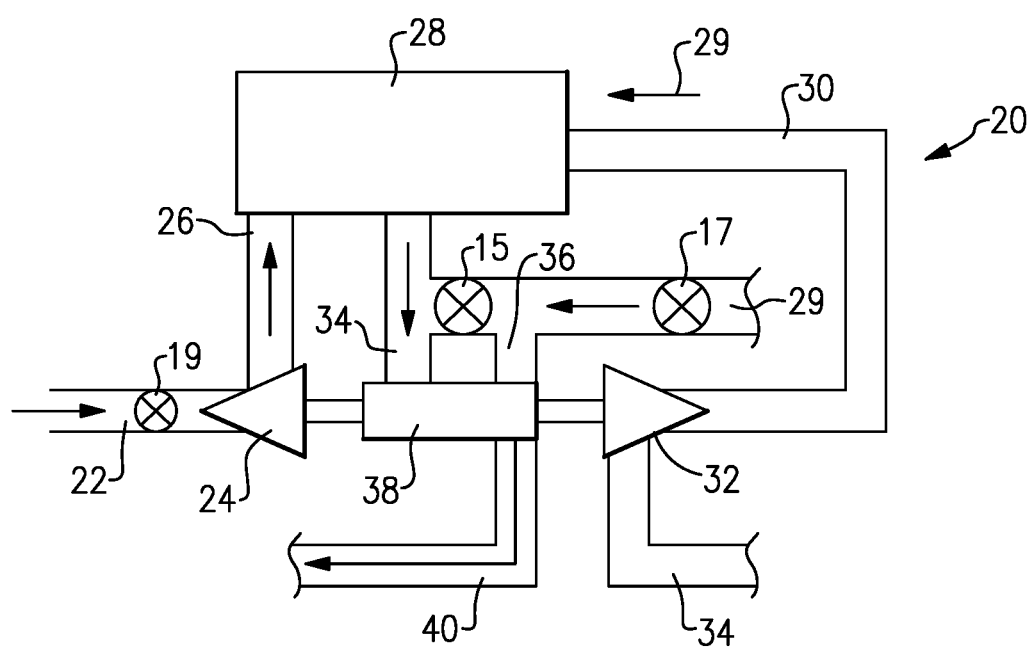
FIG. 1 schematically shows a prior art system.

A compressor drive system 20 is illustrated in FIG. 1. Air inlet 22 passes through a first stage compressor 24. The system 20 may be on an associated aircraft, and the inlet 22 may communicate with cargo bay air discharge. The inlet 22 passes to the first stage compressor 24, and an outlet 26 of the compressor 24 passes through a heat exchanger 28.

The air in the heat exchanger 28 may be cooled such as by ram air 29 from the associated aircraft. Downstream of the heat exchanger 28, the air passes into a conduit 30 leading to a second stage compressor 32. Downstream of the second stage compressor 32 the air passes into a conduit 34 where it is delivered to a use or uses.

Example uses for system 20 include a nitrogen gas generation system, a cabin air compression system for an air cycle based refrigeration system, a vapor compression based refrigeration system or a supplemental cooling system. This list should not be taken to exclude other uses.

Another branch of air downstream of the heat exchanger 28 passes into a conduit 34 where it is delivered into an electric motor 38. That air is supplemented by air such as from the ram air source 29, and passes into a second conduit 36 for motor cooling. Downstream of the motor 38 the cooling air is connected to an exhaust 40 which may be a dump to atmosphere.

Valve 19 is controlled to control flow to compressor 24. Check valve 17 controls flow from line 29. Motor cooling shut off valve 15 controls flow to motor 38.

Applicant has recognized that under certain flight conditions this system may provide undesirably low cooling air flow. As an example, at climb and descent the airflow does not always reach desired levels.

FIG. 2A shows an embodiment 100 under this disclosure. The inlet 122 delivers air to the first stage compressor 124. An outlet 126 of the compressor 124 communicates with an inlet 130 for a second stage compressor 132 having an outlet 134.

A motor 138 is shown having a rotor 142 rotating with a shaft 140. Shaft 140 is connected to drive both compressor stages 124 and 132. A stator 144 includes cooling air passages 146.

A fan impeller 148 is also driven by shaft 140 and is upstream of the impeller of compressor stage 124.

A cooling air exit 150 is downstream of the fan 148 and upstream of the compressor 124. The exit 150 communicates with a conduit 152 that passes into the motor 138 and its cooling air passages 146. An outlet 154 of the cooling air is passed to a dump to atmosphere.

Now, due to the increase in pressure from the fan 148, air is provided in sufficient quantities during all flight conditions.

Figure 2B:
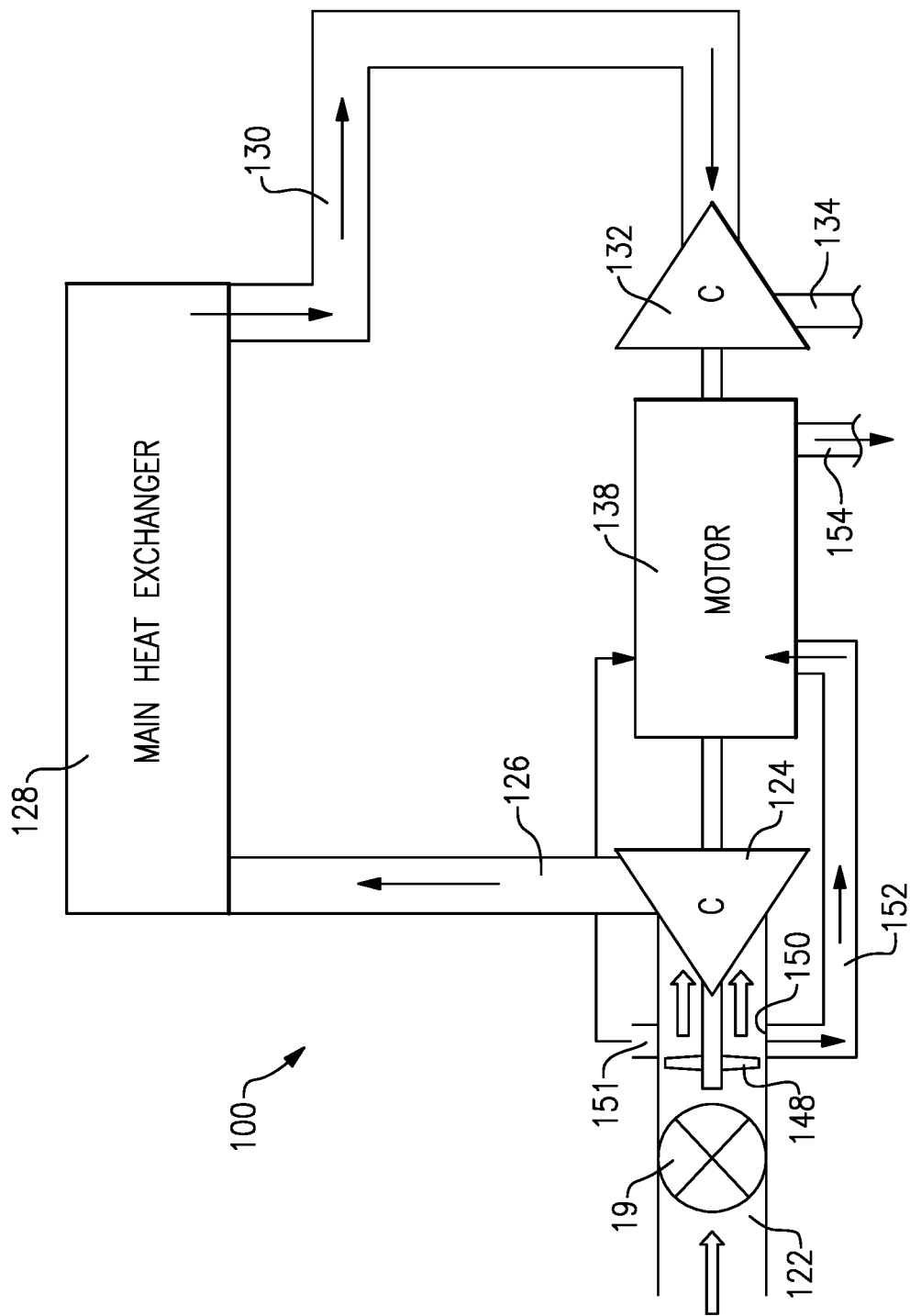
FIG. 2B schematically shows the arrangement of FIG. 2A.

FIG. 2B is a schematic of the system 100, and shows the outlet 126 of the first stage compressor 124 passing through a main heat exchanger 128 as in the FIG. 1 system. The air is returned at 130 to the second stage compressor 132.

An alternative embodiment is also shown in this Figure wherein there is a second cooling air exit 151 intermediate the fan 148 and compressor stage 124.

As is clear, in both embodiments exits 150 and 151 are upstream of the first stage compressor 124. Also, both exits 150 and 151 are intermediate the fan 148 and compressor 124.

FIG. 2C shows an example fan 148 having a plurality of blades 156.

Figure 3:
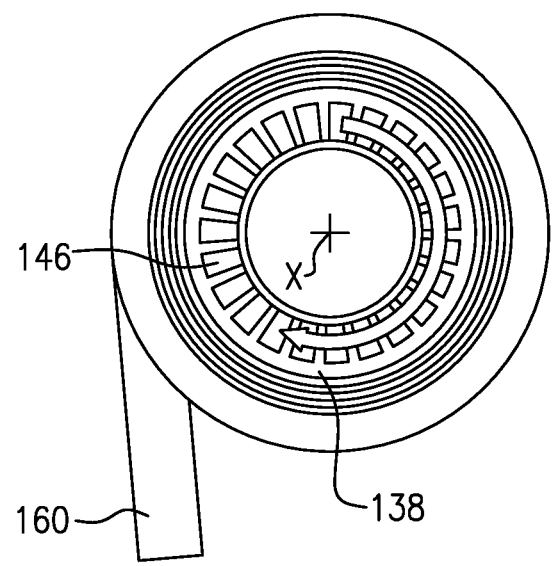
FIG. 3 shows a first detail.

FIG. 3 shows a detail of the conduit 152 leading to an inlet 160 passing into motor 138. Also, the cooling air passages 146 are illustrated surrounding a rotational axis X. As can be appreciated, inlet 160 is tangential to the motor 138 relative to the axis X.

In the prior art FIG. 1 the inlet was perpendicular to the axis X. The tangential entry provides more uniform cooling air about the circumference of the motor 138.

Figure 4:
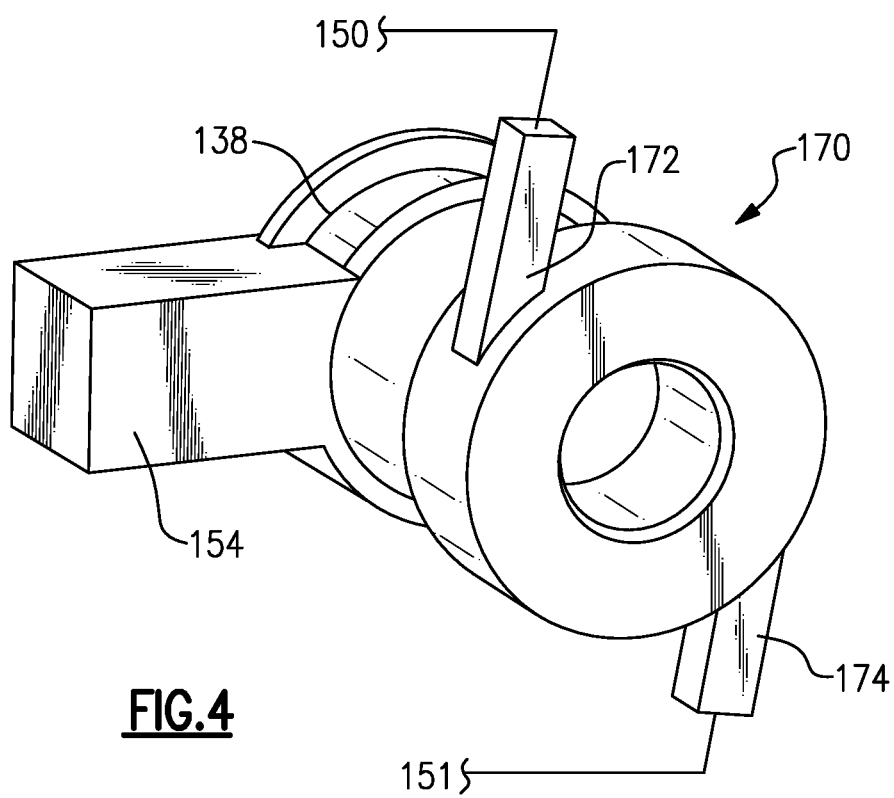
FIG. 4 shows an alternative embodiment.

FIG. 4 shows an embodiment 170 wherein there is a first inlet 172 associated with exit 150 and a second inlet 174 associated with exit 151. This provides even more uniform cooling of the motor about its circumference.

Due to the air entering the motor housing in a tangential direction, the air moves more thoroughly in a circumferential direction to provide the more uniform cooling about the circumference of the motor stator winding end turn. More uniform flow also allows uniform flow distribution in plurality of cooling channels 146. In this manner temperature non uniformity on the stator winding can be reduced by 10 to 15 C.

Although embodiments have been disclosed, a worker of skill in this art would recognize that modifications would come within the scope of this disclosure. For that reason, the following claims should be studied to determine the true scope and content of this disclosure.

What is claimed is:

1. A compressor system comprising:
a compressor, and an electric motor driving a shaft to drive said compressor;
an inlet to be connected to a source of air to be compressed;
said inlet connected to said compressor;
a fan impeller mounted in the inlet upstream of the compressor;
a cooling air exit communicating with said inlet upstream of the compressor, said cooling air exit connected to said motor to provide cooling air to said motor; and
wherein said cooling air exit has an inlet to said motor which is tangential relative to an outer housing of said motor.

2. The system as set forth in claim 1, wherein said cooling air exit is intermediate said fan impeller and said compressor.

3. The system as set forth in claim 2, wherein an outlet of said compressor communicates with a heat exchanger, and an outlet of the heat exchanger communicates with a second stage compressor.

4. The system as set forth in claim 3, wherein there are two of said cooling air exits each having an inlet to said motor which are tangential relative to said outer housing of said motor.

5. The system as set forth in claim 1, wherein there are two of said cooling air exits each connected to said motor.

6. The system as set forth in claim 1, wherein there are two of said cooling air exits each having an inlet to said motor which are tangential relative to said outer housing of said motor.

7. The system as set forth in claim 1, wherein said fan impeller has a plurality of blades.

8. The system as set forth in claim 1, wherein an outlet of said compressor communicates with a use on an aircraft.

9. A dual compressor system comprising:
a first stage compressor and a second stage compressor, and an electric motor driving a shaft to drive said first stage compressor and said second stage compressor;
an inlet to be connected to a source of air to be compressed;
said inlet connected to said first stage compressor;
a fan impeller mounted in the inlet upstream of the first stage compressor; and
a cooling air exit communicating with said inlet upstream of the first stage compressor, said cooling air exit connected to said motor to provide cooling air to said motor.

10. The system as set forth in claim 9, wherein said cooling air exit is intermediate said fan impeller and said first stage compressor.

11. The system as set forth in claim 10, wherein an outlet of said compressor communicates with a heat exchanger, and an outlet of the heat exchanger communicates with a second stage compressor.

12. The system as set forth in claim 9, wherein there are two of said cooling air exits each connected to said motor.

13. The system as set forth in claim 9, wherein said cooling air exit has an inlet to said motor which is tangential relative to an outer housing of said motor.

14. The system as set forth in claim 13, wherein there are two of said cooling air exits each having an inlet to said motor which are tangential relative to said outer housing of said motor.

15. The system as set forth in claim 13, wherein there are two of said cooling air exits each having an inlet to said motor which are tangential relative to said outer housing of said motor.

16. The system as set forth in claim 9, wherein said fan impeller has a plurality of blades.

17. The system as set forth in claim 9, wherein an outlet of said second stage compressor communicates with a use on an aircraft.

* * * * *